(12) United States Patent
Forsey

(10) Patent No.: US 6,815,923 B2
(45) Date of Patent: Nov. 9, 2004

(54) STEPPER MOTOR JAM DETECTION CIRCUIT

(75) Inventor: Wayne Michael Forsey, Riverview (CA)

(73) Assignee: Spielo Manufacturing Incorporated, Moneton (CA)

( * ) Notice: Subject to any disclaimer, the term of this patent is extended or adjusted under 35 U.S.C. 154(b) by 26 days.

(21) Appl. No.: 10/215,487

(22) Filed: Aug. 8, 2002

(65) Prior Publication Data

US 2004/0027089 A1 Feb. 12, 2004

(51) Int. Cl.[7] ............................................... H02P 8/36
(52) U.S. Cl. ..................... 318/685; 318/162; 388/903; 388/904
(58) Field of Search ................................ 318/138, 162, 318/163, 254, 434, 685, 696, 701; 388/903, 904

(56) References Cited

U.S. PATENT DOCUMENTS

| | | | | |
|---|---|---|---|---|
| 4,030,720 A | * | 6/1977 | Jones | 493/12 |
| 4,074,179 A | * | 2/1978 | Kuo et al. | 318/696 |
| 4,280,084 A | * | 7/1981 | Chiang | 318/696 |
| 4,300,085 A | * | 11/1981 | Monma et al. | 318/696 |
| 4,319,175 A | * | 3/1982 | Leenhouts | 318/696 |
| 4,791,343 A | * | 12/1988 | Ahrendt | 318/696 |
| 4,896,089 A | * | 1/1990 | Kliman et al. | 318/701 |
| 5,059,883 A | * | 10/1991 | Takahashi | 318/696 |
| 5,801,503 A | * | 9/1998 | Kim et al. | 318/434 |
| 5,929,542 A | * | 7/1999 | Ohnstein et al. | 310/40 MM |
| 5,936,655 A | | 8/1999 | Bierdermann | |
| 5,980,142 A | | 11/1999 | Inui | |
| 2001/0015748 A1 | | 8/2001 | Oishi | |
| 2001/0033320 A1 | | 10/2001 | Sugiyama et al. | |
| 2001/0055057 A1 | | 12/2001 | Sato | |
| 2002/0015087 A1 | | 2/2002 | Orita et al. | |
| 2002/0021349 A1 | | 2/2002 | Lee | |
| 2002/0057305 A1 | | 5/2002 | Kao et al. | |

FOREIGN PATENT DOCUMENTS

| CA | 1300428 | 2/1992 |
|---|---|---|
| CA | 1319855 | 7/1993 |
| CA | 2164244 | 4/1999 |

* cited by examiner

*Primary Examiner*—Bentsu Ro
(74) *Attorney, Agent, or Firm*—Cassan Maclean

(57) ABSTRACT

Methods, devices and circuits for detecting malfunctions in stepper motors. A signal from a driver circuit to a stepper motor that is proportional to the current in the windings of the stepper motor is detected. This signal is then amplified and integrated for ease of comparison. The resulting signal is then compared to a specific entry in a table of values with each entry in the table corresponding to an operating profile of the stepper motor. If the resulting signal does not correspond to the operating profile for which the motor a configured, the stepper motor is jammed. A suitable alarm and a corresponding sequence of actions may then be triggered.

24 Claims, 3 Drawing Sheets

STEPPER MOTOR JAM DETECTION CIRCUIT

FIELD OF THE INVENTION

The present invention relates to electrical motors and is particularly applicable but not limited to methods and devices for detecting malfunctions in an electrical stepper motor.

BACKGROUND TO THE INVENTION

The ubiquity and popularity of lottery games is undisputed. Everyday numerous people in different countries buy lottery tickets in the hope of striking it rich. Arguably, the most popular form of such lotteries, and certainly the one with the largest payoffs, is the game of Lotto, typically sold through an electronic online lottery system. For this type of a lottery, for each wager, a player selects a predetermined number of numerals from a finite pool of choices. A draw is then performed during which the same predetermined number of numerals are randomly selected from the pool of choices. Depending on the number of matches between a player's selected numerals and the randomly selected numerals, the player wins prizes.

For a game as outlined above, a database of numbers selected by players is created and, for each wager, a player is provided with a ticket. The ticket has printed on it not only the amount of the wager but also the sets of numerals selected by the player. The ticket then becomes the player's proof that he made a wager and what numerals he wagered on. Another important part of the ticket, aside from the numerals selected by the player, is the ticket's identifying number. This identifying number correlates to a record at the lottery central system that contains the details about that particular ticket.

Clearly, the printing of the lottery ticket, usually done at the point of sale terminal, is important. It is for this reason that the ticket printers need to have some way of determining whether a print job has been completed or not. Since each ticket constitutes a print job, a successful print job means that a particular ticket has validly been printed and, as such, the record for that printed ticket is valid. The valid record can then be added to the records which will be checked against the winning numbers.

Unfortunately, malfunctions in the printer, and specifically printer jams, can cause trouble. A printer jam does not necessarily stop the printer from printing. Instead, in one type of printer jam, the printer head may continue to print with the paper not being fed properly. This leads to the data destined for a whole ticket or tickets to be printed on a single line on the paper. Such a condition is usually not automatically reported to the lottery central system so that when a printer paper feed jams, the print head continues to print and the lottery ticket terminal, and hence the lottery central system, is under the impression that tickets are being printed. While this does not affect the entry and storage of valid records, there is no corresponding evidence of a valid ticket being printed. The player does not have any proof of his or her wager as the ticket has been misprinted due to the printer jam. While the above scenario describes a paper feed problem, other printer jam scenarios which lead to the misprinting of tickets are possible.

One attempt to solve the above problem of tracking the paper feed in the printer and reporting any errors when they occur involved the use of special paper. This approach used specially printed paper with regularly spaced dots or other marks printed on the back of the paper. An optical scanner capable of detecting the marks determined the speed of the paper feed by counting the number of marks detected for every given period of time. When the speed fell below a certain threshold, there was, in all probability, a paper jam. While this approach works, it cannot be easily adapted to different types of printers as it requires not only specialized paper but also specialized hardware including at least one optical sensor to detect the marks on the paper.

Based on the above, there is a need for a solution that can easily be built into printers and which does not require special paper.

It is therefore an object of the present invention to at least mitigate if not overcome the shortcomings of the prior art.

SUMMARY OF THE INVENTION

The present invention relates to methods, devices and circuits for detecting malfunctions in stepper motors. A driver circuit driving a stepper motor produces a signal proportional to the current in the windings of the stepper motor. This signal is then amplified and integrated for ease of comparison. The resulting signal is then compared to a specific entry in a table of values with each entry in the table corresponding to an operating profile of the stepper motor. If the resulting signal does not correspond to the operating profile for which the motor is configured, the stepper motor is jammed or stalled. A suitable alarm and a corresponding sequence of actions may then be triggered.

In a first aspect the present invention provides a method for detecting a specific condition in a device having an electric motor, the method comprising:

a) determining a signal level for at least one winding of said motor;

b) comparing said signal level to a predetermined expected signal level range; and c) generating an alarm relating to said specific condition in said device in the event said signal level is not within said predetermined expected signal level range.

In a second aspect the present invention provides a circuit for detecting malfunctions in a device having an electric motor, the circuit comprising:

feedback circuit means for retrieving a feedback signal related to a signal in at least one winding in said motor;

comparing circuit means for comparing said feedback signal with an expected signal level range, wherein a malfunction is detected when said feedback signal is not within said expected signal level range.

In a third aspect the present invention provides a system for detecting malfunctions in a motor, the system comprising:

processing means for comparing a feedback signal with an expected signal level range;

motor driver means for driving said motor and for producing said feedback signal, said feedback signal being related to a current level in at least one winding of said motor, wherein said feedback signal is received by said processing means from said motor driver means and a malfunction is detected when said feedback signal level is not within said expected signal level range.

BRIEF DESCRIPTION OF THE DRAWINGS

A better understanding of the invention will be obtained by considering the detailed description below, with reference to the following drawings in which.

DETAILED DESCRIPTION

Figure 1:
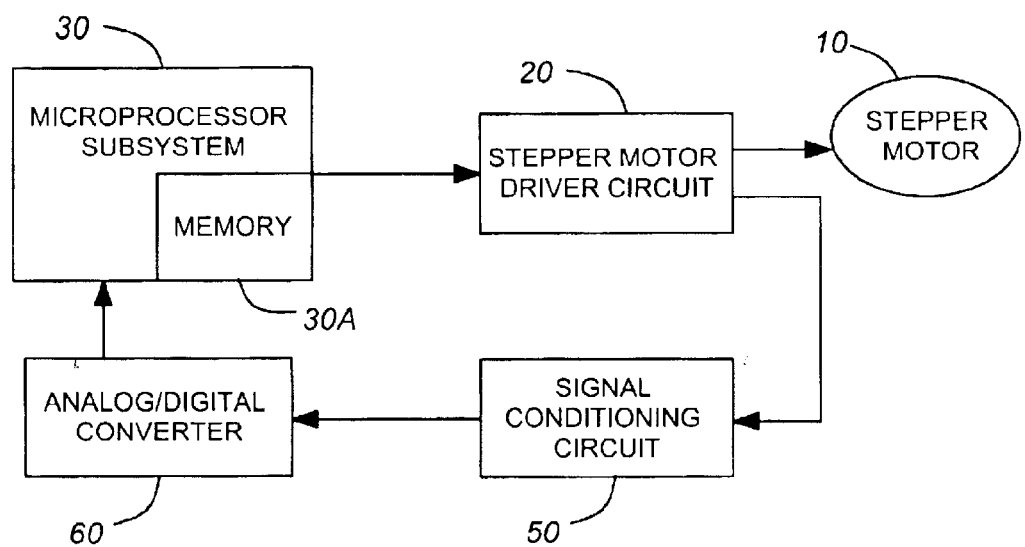
FIG. 1 is a block diagram of a system for detecting malfunctions in an electric motor according to one embodiment of the invention.

Referring to FIG. 1, a block diagram of a stepper motor jam detection system is illustrated. A stepper motor 10 is controlled by a driver circuit 20. The driver circuit 20, in turn, receives input from a microprocessor subsystem 30 that controls the output of the driver circuit 20. A feedback connection 40 from the driver circuit 20 feeds into a signal conditioning circuit 50. The output of the signal conditioning circuit 50 then feeds an analog/digital (A/D) converter 60. The output of the A/D converter 60 then feeds the microprocessor subsystem 30.

In operation, the microprocessor subsystem 30 sends digital control signals to the driver circuit 20. Based on these digital control signals, the driver circuit 20 controls the currents in the windings of the stepper motor 10. A feedback signal from the driver circuit 20 to the signal conditions circuit 50 sent via feedback connection 40, provides an indication of the current in the windings of the stepper motor 10. Once this feedback signal is properly conditioned for ease of use by the signal conditioning circuit 50, the A/D converter 60 converts the analog signal (a conditioned feedback signal) into a digital signal. This resulting digital signal is then sent to the microprocessor subsystem 30. The digital signal is then compared to an expected signal level and, based on the results of the comparison, an alarm may be generated by the microprocessor subsystem 30 if the digital signal from the A/D converter 60 indicates a motor jam.

To determine if there is a motor jam, the microprocessor subsystem 30 is equipped with a memory 30A which contains a preprogrammed lookup table. The preprogrammed lookup table has entries which correspond to specific tasks which the stepper motor may be executing. In one embodiment, the table entries correspond to speeds at which the stepper motor is to be operating. Each entry consists of a signal value range corresponding to an acceptable digital signal value for a specific motor task or setting. Thus, if the stepper motor is to execute a task requiring a certain speed setting, the table entry for that task/speed will consist of the acceptable digital signal value range for that task/speed. Since the feedback signal from the driver circuit is usually a voltage reading, the entries in the table may therefore be voltage ranges. If the digital signal received by the microprocessor subsystem 30 is substantially different from the expected range, then a malfunction may have occurred with the stepping motor. Alarms may then be generated or exception handling procedures may then be initiated once this condition is detected. Experiments for a specific implementation have shown that a substantially lower digital signal value from the expected signal value indicates a stepper motor jam. It should be noted that determining which profile/signal value range is to be used for comparison purposes is straightforward. The microprocessor subsystem 30 determines what is to be the task/speed of the stepper motor 10 and, as such, can use this predetermined setting to retrieve the expected value from the look up table when sending the control signals to the driver circuit 20.

It should be noted that while this document refers to a signal value range corresponding to an acceptable digital signal value for a motor's task or speed, this signal value range may be implemented by using a reference point value. The reference point value can constitute a minimum or a maximum acceptable value for the digital signal. If the reference point value is used as a minimum value, any digital signal reading that is less than the reference point value indicates a malfunction or an alarm condition. Conversely, if the reference point value is used as a maximum value, any digital signal reading that is greater than the reference point value indicates the presence of the malfunction or alarm condition.

In one embodiment, the microprocessor subsystem 30 is comprised of a microcontroller, a number of memory chips, including flash memory for storing a program and the lookup table, and assorted support chips and circuitry. It has been found that a microprocessor compatible with the Intel 8051 series of microcontrollers (such as the DS80C390 manufactured by Dallas Semiconductor) provided acceptable results. However, any suitable processing device such as a microcontroller, a microprocessor, or dedicated processing control circuitry may be used.

The driver circuit 20 may consist of a chip set specifically designed as a driver for a stepper motor 10. The chip set may consist of single or multiple integrated circuits (ICs) which collectively performs the driver function. The driver circuit 20 receives digital input from the microprocessor subsystem 30 (perhaps through a latch) to determine which winding of the stepper motor receives current and when. The feedback signal, sent to the signal conditioning circuit 50 via the feedback connection 40, is proportional to the current being sent by the driver circuit 20 to the windings of the stepper motor 10. Such a feedback signal is ideally a voltage proportional to the current in the stepper motor windings. For ease of implementation, a stepper motor driver integrated circuit (IC) which specifically implements a sense lead carrying this feedback signal may be used. In one embodiment, favourable results have been obtained using the TEA 3718 family of stepper motor driver ICs manufactured by SGS-Thomson Microelectronics. However, other stepper motor driver ICs with a sense lead, such as the M54646AP and M54676P from Mitsubishi and the NJM3717 from New Japan Radio Co., Ltd., may be used. Clearly, depending on the number of windings a stepper motor may have, a corresponding number of driver ICs are to be used. In one embodiment, a 2 coil stepper motor will need two parallel driver ICs, with each driver IC driving one coil. Any stepper motor driver circuit, such as the examples listed above, which implements the chopper current control method of controlling the current in the stepper motor may be used.

The signal conditioning circuit 50 is used to amplify the feedback signal and integrate the signal, resulting in a conditioned feedback signal. The feedback signal may be too weak to be of proper use (in the order of hundreds of mV) and the feedback signal may be difficult to directly convert from an analog to a digital signal. To rectify this, cascaded amplifier and integration circuits may be used in the signal conditioning circuit 50.

Figure 2:
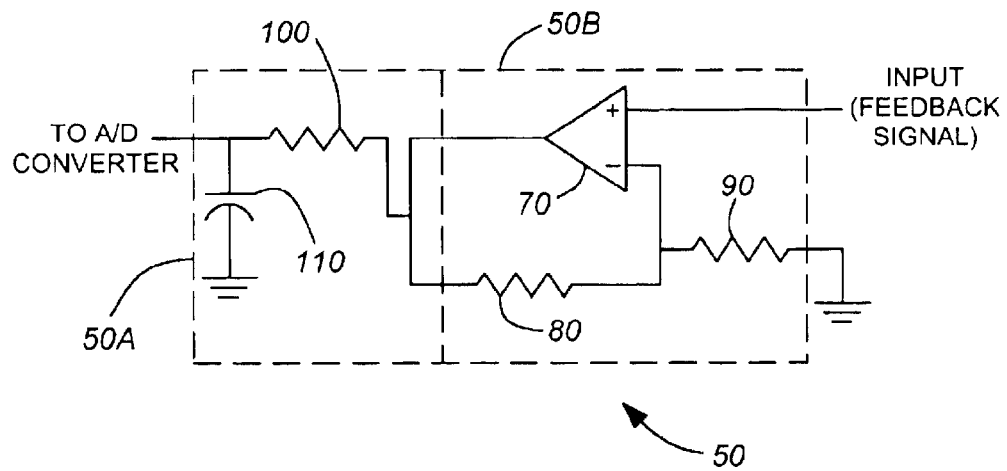
FIG. 2 is a circuit diagram of a signal conditioning circuit for use with the system illustrated in FIG. 1.

Referring to FIG. 2, an example of a conditioning circuit 50 is illustrated. As can be seen from FIG. 2, in one embodiment the integrating circuit 50A is an RC low pass filter which effectively integrates the output of an amplifier circuit 50B. The input to amplifier circuit 50B is the feedback signal and the amplifier circuit 50B itself is composed of an operational amplifier (OA) 70 and a resistance 80 coupled between the negative input of the OA 70 and its output. A second resistance 90 is coupled between ground and the negative input of OA 70. The feedback signal is fed into the positive input of OA 70. Integrating circuit 50A consists of a resistance 100 receiving the output of circuit 50B and a capacitor 110 coupled between ground and the other end of the resistance 100. The amplifier circuit 50B receives the feedback signal, amplifies it, and passes it on to integrating circuit 50A. Integrating circuit 50A then integrates the amplified feedback signal, thereby "cleaning up" the signal and making it suitable for conversion from analog to digital.

The A/D converter 60 may be, for ease of implementation, an off the shelf component. Favourable results have been achieved using an AD7829 8 channel sampling analog/digital converter IC manufactured by Analog Devices.

Figure 3:
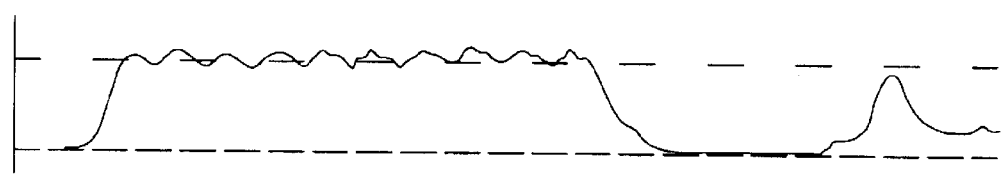
FIG. 3 is a waveform illustrating the range of feedback signal levels for a completed task.
Figure 4:
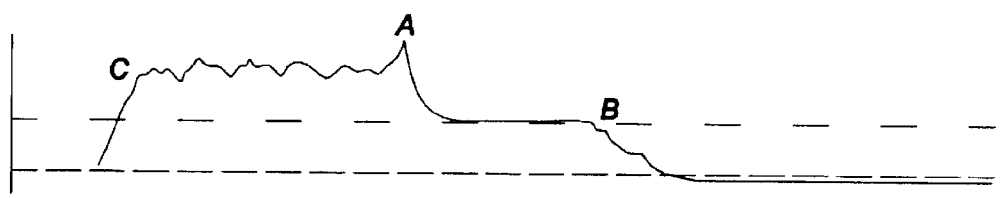
FIG. 4 is a waveform illustrating the differing feedback signal levels encountered when a malfunction occurs in an electric motor.

Referring to FIG. 3, a waveform derived from the current of the windings of the stepper motor is illustrated. The waveform is that of the conditioned feedback signal during operation of the stepper motor. The waveform illustrates the conditioned feedback signal after it has passed through the signal conditioning circuit and prior to its entering the A/D converter 60. As can be seen, the conditioned feedback signal level stays within a very narrow range when the motor is in operation. Once the motor is turned off, the conditioned feedback signal returns to zero. However, during a malfunction or an alarm condition, this conditioned feedback signal level is much greater or much lesser than the regular narrow range. FIG. 4 illustrates a waveform of a conditioned feedback signal during a motor stall. As can be seen, the conditioned feedback signal is within a narrow range until the motor stalls at point A. At this instant, a noticeable spike in the conditioned feedback signal level occurs and the conditioned feedback signal level than rapidly plateaus to a level (point B) significantly lower that its previous range (point C). It is this change in the conditioned feedback signal level that the microprocessor subsystem 30 detects when performing an effectively real-time comparison of the conditioned feedback signal level with an expected signal level range. The look up table approach is therefore advantageous since different tasks and different speeds for the stepper motor may require different current levels in the stepper motor windings and, hence, different conditioned feedback signal levels.

It should be noted that the change in the conditioned feedback signal levels during the jam or motor stall condition is due to a change in the impedance of the electric motor. Experiments for one implementation have shown that when the motor stalls, the impedance of the motor changes and that this causes a drop in the conditioned feedback signal. The conditioned feedback signal, derived from the feedback signal (a voltage proportional to the current in the motor windings), drops due to this change in the impedance. The changed impedance of the stalled motor causes the driver circuit to change the switching pattern that it uses to drive the different windings in the motor. It is this change in the switching pattern that causes the drop in the conditioned feedback signal.

It should further be noted that if a jam, stall, or malfunction of the stepper motor is detected by the microprocessor subsystem as noted above, the microprocessor subsystem may implement a number of options. Microprocessor subsystem may a) halt the job being executed;

b) send an alarm alerting an operator to the malfunction;

c) postpone the current job until the malfunction is rectified; or d) any combination of the above options.

The alarm may easily be generated by the microprocessor subsystem by setting a specific bit in a message sent to a networked central system. The central system can then record that the specific job the microprocessor subsystem was working on (such as a print job of printing a lottery ticket) was not completed and that it will therefore need to be restarted.

Figure 5:
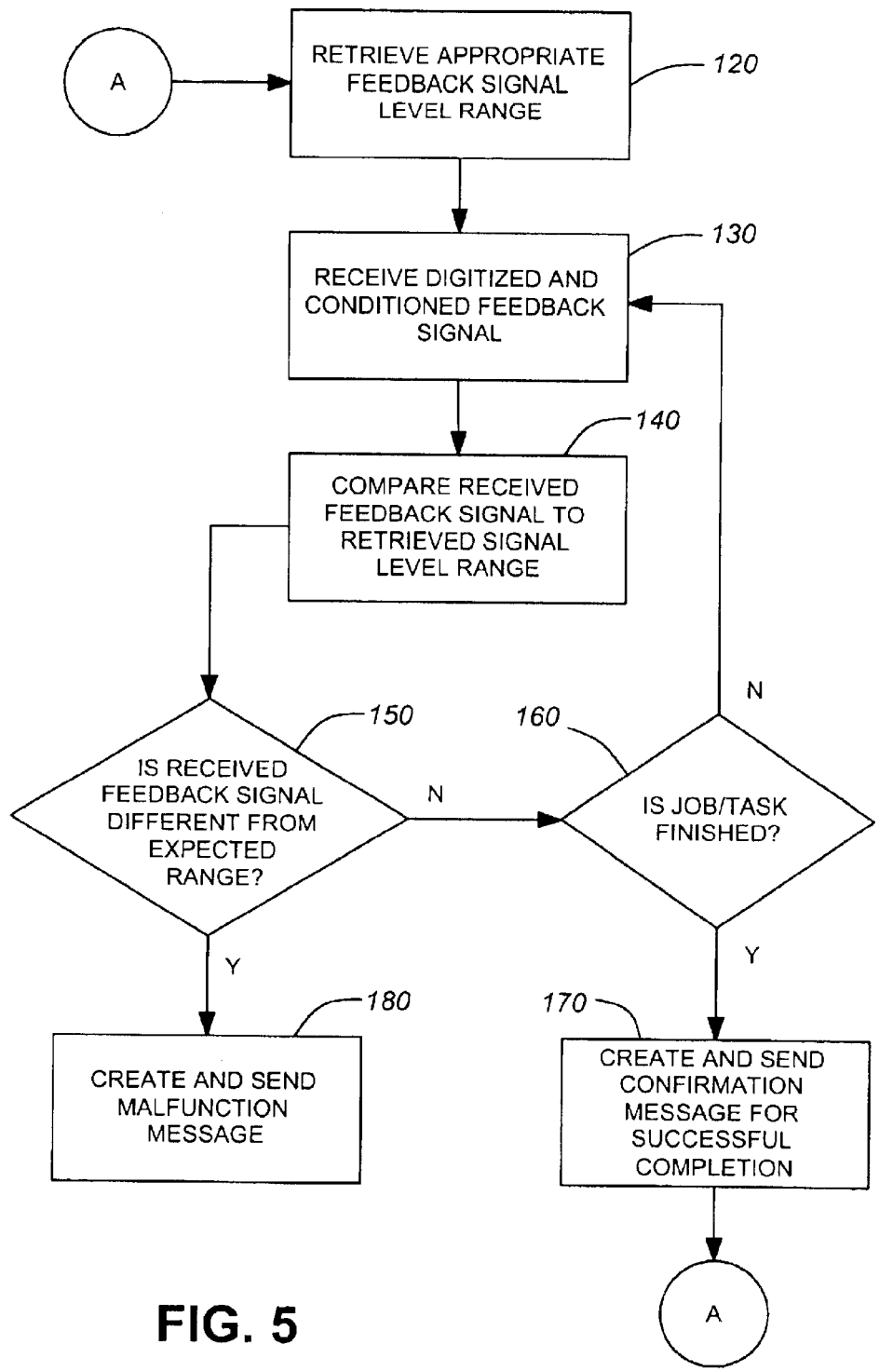
FIG. 5 is a flowchart illustrating the steps executed in a process for detecting malfunctions in an electric motor according to one aspect of the invention.

The steps in the above process are summarized in the flowchart of FIG. 5. The process begins with retrieving the appropriate expected signal levels for a specific task to be undertaken by the stepper motor (step 120). Once this is done, the stepper motor can then begin to execute its task as determined by the microprocessor subsystem. Once the coils in the stepper motor are energized by the driver circuit, the feedback signal travels back to the microprocessor subsystem and its digitized and conditioned version is received (step 130). The received digitized and conditioned feedback signal is then compared to the expected range of feedback signal levels (step 140). After the comparison, a decision is made as to whether the received digitized and conditioned feedback signal was withing the expected signal levels (step 150). If the received signal is within the expected range, then another decision (step 160) concerning whether the job is finished is made. If the task is not yet done, then the logic returns to step 130—that of receiving more digitized feedback signals. On the other hand, if the task is done, a confirmation message confirming the completion of the task is sent to the central system (step 170). The central system can then note that that particular task was completed by the stepper motor. The logic then returns to step 120 by way of connector A.

If the decision 150 is answered in the positive and that the received feedback signal is not within the expected levels, a malfunction of the motor or an alarm condition must therefore have occurred. A message is thus sent to the central system noting the malfunction and the non-completion of the task (step 180). This step may also involve the activation of an alarm through the use of the microprocessor subsystem.

It must be noted that the steps in the flowchart of FIG. 5 are those executed by the microprocessor subsystem. The amplification and integration of the feedback signal (executed by the conditioning circuit), is optional but convenient. Also, while the above invention may be implemented in lottery terminal printers, it may also be implemented in other types of printers and/or any other devices (such as scanners) which use electrical motors. Furthermore, while the above description refers to stepper motors, other types of electrical motors may be used with the selection of appropriate driver circuitry/ICs.

A person understanding this invention may now conceive of alternative structures and embodiments or variations of the above all of which are intended to fall within the scope of the invention as defined in the claims that follow.

What is claimed is:

1. A method for detecting a specific condition in a device having an electric motor, the method comprising:

a) determining a signal level for at least one winding of said motor;

b) comparing said signal level to a predetermined expected signal level range; and c) generating an alarm relating to said specific condition in said device in the event said signal level is not within said predetermined expected signal level range, wherein said signal level is integrated prior to step b, wherein said predetermined expected signal level range is selected from a table having multiple entries, each of said entries corresponding to a specific task profile for said motor.

2. A method according to claim 1 wherein said motor is a stepper motor.

3. A method according to claim 1 wherein said device is a printer.

4. A method according to claim 1 wherein said signal level is related to a current level in said at least one winding of said motor.

5. A method according to claim 1 wherein said signal level is a voltage level corresponding to a current level in said at least one winding in said motor.

6. A method according to claim 5 wherein said step of generating an alarm in step c) is executed in the event said voltage level is lower than said predetermined expected signal level range.

7. A method according to claim 1 wherein said expected signal level range corresponds to a predetermined reference point value such that said signal level is within said signal level range if said signal level is greater than said reference point value.

8. A method according to claim 1 wherein said expected signal level range corresponds to a predetermined reference point value such that said signal level is within said signal level range if said signal level is less than said reference point value.

9. A method according to claim 1 wherein said specific condition is a malfunction.

10. A circuit for detecting malfunctions in a device having an electric motor, the circuit comprising:

feedback circuit means for retrieving a feedback signal related to a signal in at least one winding in said motor;

comparing circuit means for comparing said feedback signal with an expected signal level range, conditioning circuit means for conditioning said feedback signal being compared to said expected signal level range, said conditioning circuit means integrating said feedback signal, wherein a malfunction is detected when said feedback signal is not within said expected signal level range; and wherein said predetermined expected signal level range is selected from a table having multiple entries, each of said entries corresponding to a specific task profile for said motor.

11. A circuit according to claim 10 further comprising:

alarm generation circuit means for generating an alarm related to said malfunction detected by said circuit.

12. A circuit according to claim 10 wherein said signal in at least one winding in said motor is a current.

13. A circuit according to claim 10 wherein said motor is a stepper motor.

14. A circuit according to claim 10 wherein said feedback signal is a voltage.

15. A circuit according to claim 14 wherein said voltage is proportional to a current in said at least one winding in said motor.

16. A circuit according to claim 14 wherein said conditioning circuit means further comprises:

an amplification circuit means far amplifying said feedback signal.

17. A circuit according to claim 16 wherein said conditioning circuit means further comprises:

an integration circuit means for integrating said feedback signal.

18. A circuit according to claim 10 wherein said device is a printer.

19. A circuit according to claim 10 wherein said device is a scanner.

20. A system for detecting malfunctions in a motor, the system comprising:

processing means for comparing a feedback signal with an expected signal level range;

motor driver means for driving said motor and for producing said feedback signal, said feedback signal being related to a current level in at least one winding of said motor, wherein said feedback signal is received by said processing means from said motor driver means and a malfunction is detected when said feedback signal level is not within said expected signal level range, and wherein said predetermined expected signal level range is selected from a table having multiple entries, each of said entries corresponding to a specific task profile for said motor.

21. A system according to claim 20 further including:

conditioning means for conditioning said feedback signal prior to said feedback signal being received by said processing means.

22. A system according to claim 21 wherein said conditioning means includes A/D conversion means for converting said feedback signal from an analog signal to a digitized signal.

23. A system according to claim 21 wherein said conditioning means comprises amplification means for amplifying said feedback signal.

24. A system according to claim 21 wherein said conditioning means comprises integration means for integrating said feedback signal.

* * * * *